US008761727B2

(12) United States Patent
Eriksson et al.

(10) Patent No.: US 8,761,727 B2
(45) Date of Patent: Jun. 24, 2014

(54) METHOD AND APPARATUS FOR PRE-CACHING IN A TELECOMMUNICATION SYSTEM

(75) Inventors: Göran Eriksson, Norrtälje (SE); Vladimir Katardjiev, Uppsala (SE); Leonid Mokrushin, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 186 days.

(21) Appl. No.: 13/393,143

(22) PCT Filed: Nov. 6, 2009

(86) PCT No.: PCT/SE2009/051268
§ 371 (c)(1),
(2), (4) Date: Feb. 28, 2012

(87) PCT Pub. No.: WO2011/056108
PCT Pub. Date: May 12, 2011

(65) Prior Publication Data
US 2012/0164974 A1 Jun. 28, 2012

(51) Int. Cl.
*H04M 11/00* (2006.01)
(52) U.S. Cl.
USPC ........................................................ 455/406
(58) Field of Classification Search
USPC ........................................................ 455/406
See application file for complete search history.

(56) References Cited

U.S. PATENT DOCUMENTS 6,917,960 B1 * 7/2005 Decasper et al. ............. 709/203
8,175,584 B2 * 5/2012 Estevez et al. ............. 455/414.1
(Continued)

FOREIGN PATENT DOCUMENTS

EP       1 909 066 A1    4/2008
WO     WO 03/094474 A1  11/2003
(Continued)

OTHER PUBLICATIONS

International Search Report, PCT Application No. PCT/SE2009/051268, Oct. 1, 2010.
(Continued)

*Primary Examiner* — Nathan Mitchell
(74) *Attorney, Agent, or Firm* — Myers Bigel Sibley & Sajovec, P.A.

(57) ABSTRACT

The present invention relates to file pre-caching and file retrieving in an autonomous network access module comprising a local storage, and providing network connectivity to a mobile device in a telecommunication system. The network access module comprises a local storage and provides network connectivity to a mobile device (100) within which it is comprised. A received file request to a global radio network (10) from the mobile device (100) is intercepted, where after the file is searched for among available pre-cached files, which may reside within the local storage controlled by the network access module itself, or within a local storage of a peer network access module in a local radio network 70. If the file is found within available pre-cached files, it is transparently transferred over a bus interface to the requesting mobile device. During transfer, the amount of data is measured, and the measurements are subsequently used during an accounting stage where charging related information is reported to a charging module 80 in the global radio network 10. Files may be pre-cached in a distributed storage comprised by a group of network access modules conjoined by a local radio network 70. Files allotted for pre-caching by a network operator are received and stored in network access modules but are not billed unless the files are actually consumed.

15 Claims, 5 Drawing Sheets

(56) References Cited

U.S. PATENT DOCUMENTS

| | | | |
|---|---|---|---|
| 8,310,943 B2 * | 11/2012 | Mehta et al. | 370/252 |
| 8,370,452 B2 * | 2/2013 | Harvell et al. | 709/217 |
| 2004/0063449 A1 * | 4/2004 | Fostick | 455/517 |
| 2004/0064650 A1 | 4/2004 | Johnson | |
| 2006/0246914 A1 * | 11/2006 | Oswal et al. | 455/445 |
| 2007/0005647 A1 | 1/2007 | Cugi et al. | |
| 2007/0025304 A1 * | 2/2007 | Leelahakriengkrai et al. | 370/338 |
| 2007/0050491 A1 | 3/2007 | Kataoka et al. | |
| 2007/0243821 A1 * | 10/2007 | Hundscheidt et al. | 455/3.04 |
| 2008/0039058 A1 * | 2/2008 | Ray | 455/414.3 |
| 2008/0162686 A1 | 7/2008 | Kalaboukis et al. | |
| 2009/0006308 A1 | 1/2009 | Fonsen | |
| 2009/0029644 A1 * | 1/2009 | Sue et al. | 455/3.02 |
| 2009/0280792 A1 * | 11/2009 | Leblanc et al. | 455/418 |
| 2009/0291696 A1 * | 11/2009 | Cortes et al. | 455/466 |
| 2010/0087179 A1 * | 4/2010 | Makavy et al. | 455/418 |
| 2010/0178914 A1 * | 7/2010 | Fischer et al. | 455/426.1 |
| 2010/0267403 A1 * | 10/2010 | Lungaro et al. | 455/466 |
| 2011/0065424 A1 * | 3/2011 | Estevez et al. | 455/414.3 |
| 2011/0070906 A1 * | 3/2011 | Chami et al. | 455/507 |
| 2011/0269507 A1 * | 11/2011 | Polis et al. | 455/566 |

FOREIGN PATENT DOCUMENTS

| | | |
|---|---|---|
| WO | WO 2006/041754 A2 | 4/2006 |
| WO | WO 2009/017712 A1 | 2/2009 |

OTHER PUBLICATIONS

Cheng Wang et al.: "distributed Caching and adaptive Search in Multilayer P2P Networks", Proceedings of the 24$^{th}$ International Conference on Distributed Computing Systems (ICDCS'04), IEEE, 2004, pp. 1-8.

Communication with Supplementary European Search Report, EPO Application No. 09851150.4, May 6, 2013.

* cited by examiner

METHOD AND APPARATUS FOR PRE-CACHING IN A TELECOMMUNICATION SYSTEM

CROSS REFERENCE TO RELATED APPLICATIONS

This application is a 35 U.S.C. §371 national stage application of PCT International Application No. PCT/SE2009/051268, filed on 6 Nov. 2009, the disclosure and content of which is incorporated by reference herein in its entirety. The above-referenced PCT International Application was published in the English language as International Publication No. WO 2011/056108 A1 on 12 May 2011.

TECHNICAL FIELD

The present invention relates to file pre-caching and file retrieving in an autonomous network access module comprising a local storage, and providing network connectivity to a mobile device in a global radio network.

BACKGROUND

With increasing popularity of content streaming services such as YouTube© and Spotify©, the number of users in the mobile space is increasing, and the average traffic load with them. The innovators and early adopters of yesterday are now expecting their mobile devices to handle download faster than before with maintained quality and security. In the wake comes the early-majority comprising experienced desktop users projecting desktop user experience expectations onto the mobile device.

Mobile networks typically feature a wide traffic dispersion range. The load during a few solitary peak hours per day may be 20 times as high as the average traffic load, whereas the load during, say eight, minimum-traffic hours is virtually zero. The traffic load also varies on a weekly and seasonal basis. An un-balanced network must in effect be designed to handle peak level traffic 24-7, all year round, in order to avoid disgruntled customers during the relatively few peak hours. During the off-peak hours, that un-balanced network is consequently an under-deployed liability, rendering lower Return On Assets, to stakeholders' dismay.

Various load-balancing methods have been presented to address the above problems, but in doing so, they cause new ones. According to one method, the delivery of non-critical traffic, e.g. file downloads, is reduced or delayed during peak hours. This is a very crude way of load-balancing, which certainly enables increased system deployment, but at the expense of service quality.

Other methods attempt to cache content locally so that the network does not need to be invoked when the user requests the content. The most common ones are client "agents", e.g. Google Web Accelerator©, that silently download files a user is likely to access and store it locally until the user requests it. The method reduces peak load at the expense of an acceptable increase in average load. However, the network operator cannot distinguish pre-downloading traffic from other traffic and will therefore bill the end-user for downloading of content that was neither requested nor consumed. This is a major disincentive to employing pre-downloading software.

Yet other methods send encrypted data to the client proactively, storing it as an encrypted file on the system, and then either sending a "decrypt" signal from the network or allowing the user to request or purchase the key to decrypt the data with. The sent data is considered property of the network operator until decrypted. The transfer is not billed, but the act of unlocking the data is. However, these method are non-transparent, as the end result is encrypted data, which may perhaps even require user interaction to purchase an unlock key. They are also susceptible to software tampering.

SUMMARY

It is the object to obviate at least some of the above disadvantages and provide improved inter-related methods, apparatuses and computer media products avoiding the above mentioned drawbacks.

A first aspect of the invention relates to two inter-related methods for file pre-caching and file retrieval in an autonomous network access module comprising a local storage and providing network connectivity to a mobile device in a global radio network. The first inter-related method comprises the steps: receiving a file request to the global radio network from the mobile device; intercepting the file request; searching for the requested file among available pre-cached files; if the file is found enabling the mobile device to access the file; measuring the amount of data transferred to the mobile device via a bus from the network access module; and accounting for the amount of data transferred, to a charging module in the global radio network.

The method may further comprise the step: receiving and storing in the local storage a file comprising meta data, allotted for pre-caching by an operator of the global radio network. The searching step may further comprise searching for the requested file in the local storage.

The searching step may alternatively or also further comprise searching for the file in a local storage of a peer network access module in a local radio network.

When searching among available files in peer network access modules, the searching step may further comprise broadcasting a file request in the local radio network; and awaiting an availability confirmation comprising meta data from the peer network access module in the local radio network.

The step of enabling, upon receiving an availability confirmation, further comprises the steps: sending a second file request to the peer network access module in the local radio network; and receiving the requested file from the peer network access module over the local radio network.

The method may comprise receiving a credit allowance from a charging module in the global radio network.

The method may further comprise the step estimating file size against remaining credit allowance; and the enabling step being contingent upon the estimation that the data transfer can be made within the remaining credit allowance.

The first aspect's second inter-related method relates to file pre-caching and file retrieving in an autonomous network access module comprising a local storage and providing network connectivity to a mobile device in a global radio network comprising the steps: receiving and storing in the local storage a file comprising meta data, allotted for pre-caching by an operator of the global radio network; receiving a broadcast file request from a peer network access module in a local radio network; searching for the requested file among available files in the local storage; and if found enabling the peer network access module to access the file.

The enabling step may comprise the step: sending an availability confirmation to the peer network access module, comprising meta data; and may further comprise the steps awaiting a second request for the same file from the peer network access module; and upon reception of the second request, sending the file to the peer network access module over the local radio network.

A second aspect of the invention relates to two inter-related network access modules, each comprised within mobile devices, and comprising local storages, radio transceivers and processing units, each connected to the mobile devices via bus interfaces.

The first network access module is adapted and configured to receive a file request to the global radio network from the mobile device; intercept the file request; search for the requested file among available pre-cached files; if found enable the mobile device to access the file; measure the amount of data transferred to the mobile device via a bus from the network access module; and account for the amount of data transferred, to a charging module in the global radio network.

The network access module may be adapted to receive and store in the local storage a file comprising meta data, allotted for pre-caching by an operator of the global radio network. It may further be adapted to search for the requested file in the local storage; and if found enable the mobile device to access the file.

The network access module may further be adapted to broadcast a file request in a local radio network; and await an availability confirmation comprising file size from the peer network access module in the local radio network.

In the enabling step, upon receiving an availability confirmation, the network access module is further adapted to send a second file request to the peer network access module in the local radio network; and to receive the requested file from the peer network access module over the local radio network.

The network access module may be adapted to receive a credit allowance from a charging module in the global radio network.

The network access module may be adapted to estimate file size against remaining credit allowance; and enable the mobile device to access the file contingent upon estimating that data transfer can be made within the remaining credit allowance.

The second network access module according to the second aspect of the invention is adapted and configured to receive and store in the local storage a file comprising file size, allotted for pre-caching by an operator of the global radio network; receive a broadcast file request from a peer network access module in a local radio network; search for the requested file among available files in the local storage; and if found enable the peer network access module to access the file.

The network access module may be adapted to send an availability confirmation to the peer network access module, comprising file meta data.

The network access module may further be adapted to await a second request for the same file from the peer network access module; and upon reception of the second request send the file including meta data to the peer network access module over the local radio network.

A third aspect of the invention relates to a computer program comprising code means for performing the steps of any method embodiment of the first aspect when the program is run on a computer.

A fourth aspect of the invention relates to a computer program product comprising program code means stored on a computer readable medium for performing the steps of any method embodiment of the first aspect, when said product is run on a computer.

The intercepting characteristic of aspects of the invention enables them to be transparent to the mobile device 100 and thus transparent to the user. Since the searching characteristics involve searching among available files it enables a distributed pre-cache storage. Because the network access module is autonomous against its mobile device, the enabling characteristic is central, as this is the only way the mobile device will get access to the file. The measuring and accounting characteristics enables charging of the actual file consumption post-caching and consequently to bill the user for actually consumed files instead of yet un-consumed files received for pre-caching. It also enables accumulative reporting, thus reducing the amount of reporting messages to the charging module. All the aspects reduce traffic dispersion ranges in a network, increase Quality of Service and enable very short delivery times and eliminate billing of un-requested data in a transparent manner.

For the purpose of completeness, the word file should be interpreted in a wide sense to include all sorts of data structures, and network-based resources. Further, with "charging" is meant a collection of procedures generating charging data. With "billing" is meant a procedure that post-processes charging data and produces a bill for the end-user. Un-billed traffic is not necessarily un-charged, but the charging data has not affected the end-users bill.

BRIEF DESCRIPTION OF THE DRAWINGS

In order to explain the invention in more detail an embodiment of the present invention will be described in detail below, reference being made to the accompanying drawings, in which.

DETAILED DESCRIPTION

Figure 1:
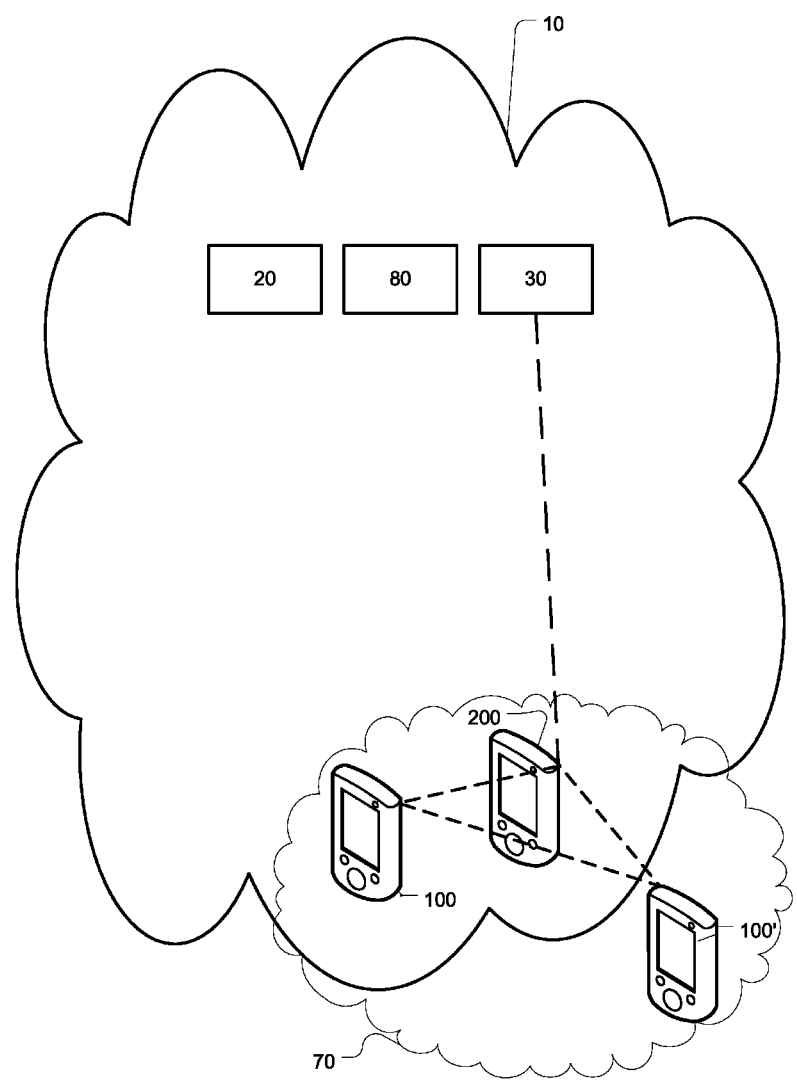
FIG. 1 is an overview of the system in which embodiments of the invention are implemented.

The system in which the present invention is implemented will now be described in relation to FIG. 1. Within a global radio network 10, operated by a network operator, a pre-cache and prediction service 20 is implemented, which manages and sends files allotted for pre-caching based on network and device specific conditions set by the network operator. The actual files are dispatched from a remote web server 30, and may be sent to network access modules comprised within mobile devices 100, 200 connected to the global radio network 10. Even though mobile device 100 may not have received any files for pre-caching and even though the mobile device 100' is not connected to the global radio network, they may still have access to pre-cached files within the mobile device 200. Besides the global radio network 10, another, local, radio network 70 is depicted in FIG. 1. The global radio network 10 also comprises a charging module 80. When a mobile device 100 with a compatible network access module connects to the global network 10, the pre-caching and prediction service 20 is informed of the network access module's existence and the amount of local storage available, as well as the data stored in the network access module's local storage. When the conditions for pre-caching are fulfilled, files allotted for pre-caching may be sent to the connecting mobile device. This traffic is differentiable from regular end-user generated traffic in the global network 10 and is not billed.

Pre-caching conditions can be one or many of a non-conclusive list such as: a network access module being connected to the global network 10, sufficiently low deployment level in certain network entities, such as e.g. a network server or router or groups of servers or routers, sufficiently low general traffic load in the global network 10, a mobile device having enough battery power to sustain pre-caching, a network access module having enough available local storage, a local radio network 70 being available to a network access module. That local radio network 70 may be a WPAN or ad-hoc network such as Bluetooth© or WiFi. A key concept in WPAN technology is known as "plugging in". In the ideal scenario, when any two WPAN-equipped devices come into personal operating space they can communicate peer-to-peer as if connected by a cable. Therefore, pre-cached files stored in the local storage of one network access module is available to that network access module, of course, but also available to any other network access module that may be connected over the local radio network 70.

Figure 2A:
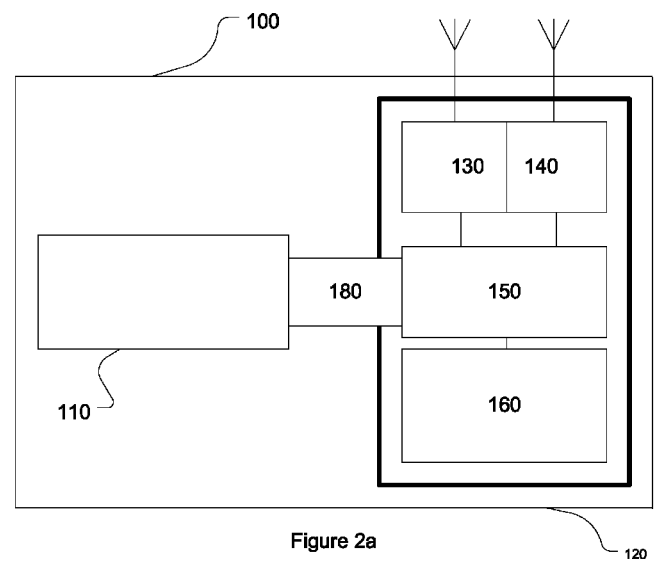
FIG. 2 is a schematic illustration of two mobile devices 100 and 200.
Figure 2B:
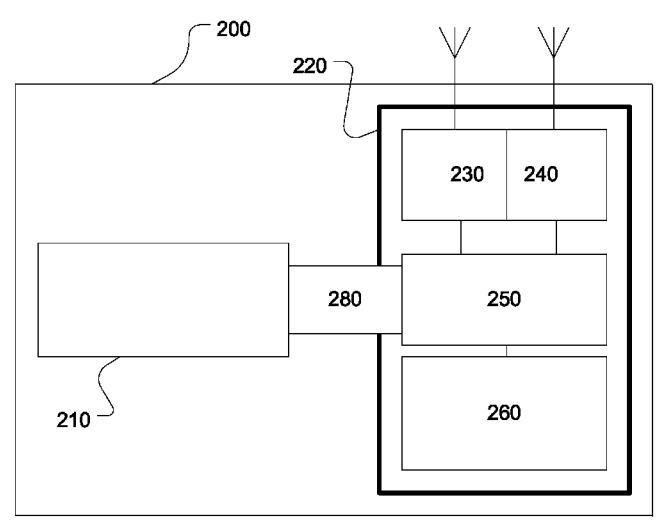

A network access module comprised within a mobile device 100 will now be described in relation to FIG. 2a. FIG. 2a displays a mobile device 100, such as for instance a mobile phone. The mobile device 100 comprises a main processing unit 110 and a network access module 120, which provides network connectivity to the mobile device 100. The network access module 120 comprises a first transceiver 130 adapted for the global radio network 10, a second transceiver 140 adapted for the local radio network 70, a local processing unit 150 and a local storage 160. The local storage 160 has a larger capacity compared to conventional network access modules, and is adapted to provide storage for un-billed pre-caching within the network access module 120. Further, a data bus 180 constitutes the interface between the network access module 120 and the mobile device 100. Because of the bus 180, any resource request from the mobile device 100 must be processed by the network access module's 120 processing unit 150, even for resources available within the local storage 160. The bus interface 180 hence entails a natural isolation of the network access module 120 from the mobile device 100, and the network access module 120 can therefore autonomously manage the mobile devices 100 access to data stored in the local storage 160. This autonomy makes it possible for the network operator to have a considerable level of trust for the network access module 120, and to consider the local storage 120 to be a secure place for pre-caching, even though the mobile device 100 may not be trusted for pre-caching. FIG. 2b displays a mobile device 200 comprising a main processing unit 250 and a network access module 220 which in turn comprises a first and second transceiver 230, 240, a local processing unit 250, a local storage 260 and a data bus 280. These components are arranged in analogy with the components of the mobile device 100 and configured and adapted in a related way.

Figure 3:
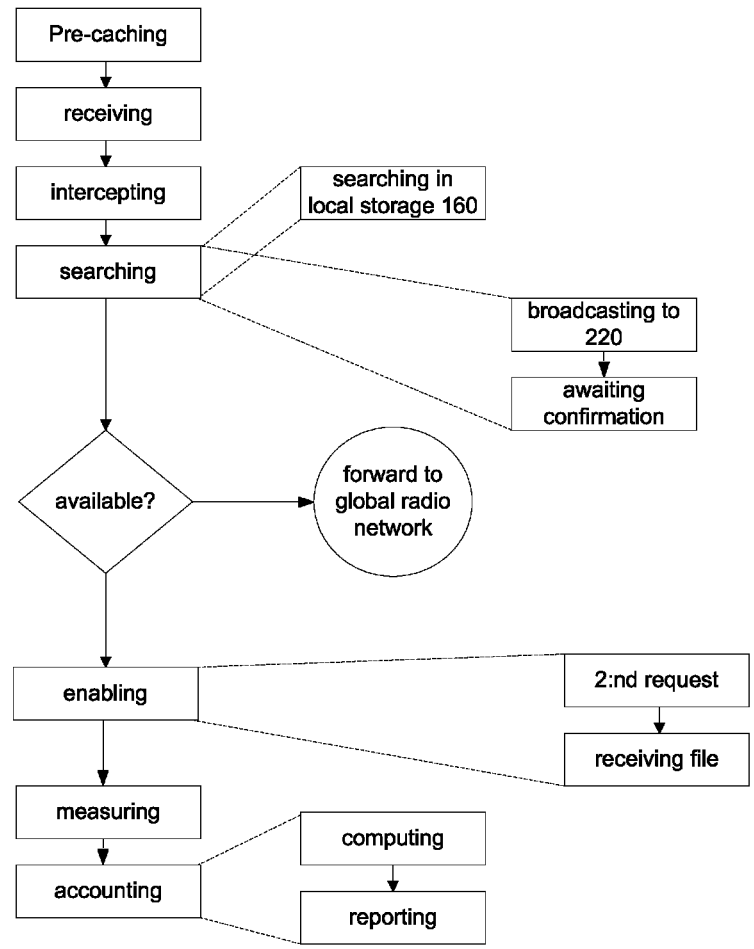
FIG. 3 is a flow-chart illustrating a method according to one embodiment.

One embodiment of the present invention will now be described in relation to FIG. 3. When the mobile device 100 is requesting a file, the network access module 120 is receiving a file request to the global radio network 10 from the mobile device 100 via the bus 180. The network access module 120 is then intercepting the file request; it is not expediting it the way the mobile device 100 intended. It is possible to perform the interception in a network-based proxy, rewriting the file's address to unequivocally point to data on the network module. However, this requires either a software component specific to the mobile devices operating system or a network component and network access.

Instead of immediately forwarding the request to the global network 10, the network access module 120 is searching for the requested file among available pre-cached files. Each file is associated with a globally unique identifier, e.g. URI's for web content, which the network access module 120 is using in its search.

If the file is found among available pre-cached files, the network access module 120 is enabling the mobile device 100 to access the file in a step that comprises opening the bus 180 interface for the main processing unit of the mobile device. While the file is being transferred, the network access module 120 is measuring the amount of data transferred to the mobile device 100 via the bus 180 from the network access module 120. In a next step, the network access module 120 is accounting for the amount of data transferred, to a charging module 80 in the global radio network 10. This may be done through the network access module 120 computing certain intermediate figures based on the measurements and reporting the measured amount of transferred data to the charging module 80.

If the file was not found, the network access module 120 may forward the original file request to the global network 10. If the mobile device 100 registered on the global network 10 during peak hours, the pre-caching and prediction service 20 will not yet have had opportunity to order pre-caching of allotted files. The local storage 160 may then be completely empty.

In one embodiment, a pre-caching step is comprised, in which the network access module 120 is receiving and storing in the local storage 160 a file comprising meta data, allotted for pre-caching by an operator of the global radio network 10. The meta data comprises file size and may also comprise other information. This step enables the network access module 120 to store available pre-cached files within its own housing. During the searching step, the network access module 120 may then be searching for the requested file in the local storage 160 it controls itself.

The local storage 160 may still be empty because the network operator may e.g. have found malware in copies of the file in the global network 10 and decided to destroy all available copies. Lastly, the prediction service 20 may just have failed to predict this particular request, and may have stored allotted several other un-billed pre-cached files for storing in the local storage 160.

In one embodiment of the invention, the searching is made among available pre-cached files stored within a group of peers in a local radio network 70. The network access module 120 may decide to do this upon first searching its own local storage 160, but it may also decide to do this as a first measure. The reason for this may be that the network access module 120 knows it has not received any files, or that its local storage 160 is empty for other reasons. Further it may not have the full capacity allowing it to pre-cache in its own local storage 160.

In this embodiment the searching step further comprises broadcasting a file request in the local radio network 70. The broadcast comprises the globally unique identifier of the requested file and reaches all peers with available pre-cached files. The network access module 120 is then awaiting an availability confirmation comprising meta data from the peer network access module 220 in the local radio network 70, whose response first reached the broadcasting network access module 120.

Upon receiving an availability confirmation, the network access module 120 is sending a second file request to the peer network access module 220 in the local radio network 70 and receiving the requested file from the peer network access module 220 over the local radio network 70.

Figure 5:
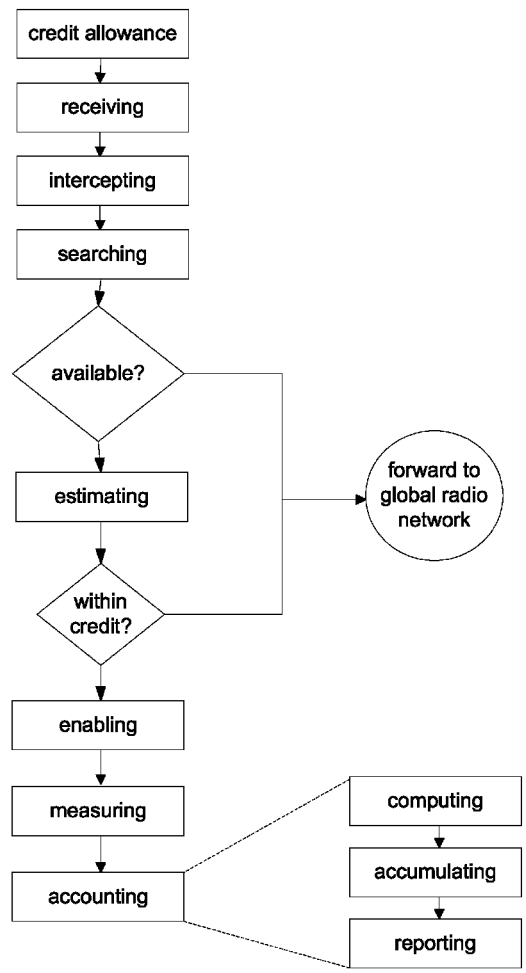
FIG. 5 is a flow-chart illustrating a method according to one embodiment of the invention.

One embodiment of the present invention will now be described in relation to FIG. 5. In this embodiment the network access module 120 is receiving a credit allowance from a charging module 80 in the global radio network 10, regularly or prompted by certain events or upon request from the network access module 120 itself. Before making the file available to the mobile device 100, the network access module 120 is estimating the file size, which has been stored together with the file in the local storage 160, or received as meta data in an availability confirmation, against remaining credit allowance. The network access module 120 is then enabling the mobile device 100 to access the file only if there is enough credit to do so, i.e. the enabling is further contingent upon the estimation that data transfer can be made within the remaining credit allowance. During the accounting step, the network access module 120 is arithmetically computing a new remaining credit allowance. This may comprise deducting credits corresponding to measured transferred data from the remaining credit allowance.

The step of reporting the measured amount of transferred data to the charging module 80 may be done directly or it may be done upon accumulating the results of several measurements, i.e. after enabling the mobile device 100 access to several files. The reporting may be done in terms of remaining credit allowance, amount of consumed credit units or measured bytes or a combination. The figures may be reported as one cumulative sum or a set of transaction posts. The network operator may e.g. have an interest in knowing what files where consumed in their entirety, what users tend to interrupt downloading etc.

The embodiment that comprises reception of a credit allowance enables leeway in charging for files consumed by the network access module 120. Not having to report charging information immediately is advantageous especially when e.g. loading a multitude of small files, such as image files e.g., from the local storage 160. It reduces processing load and conserves battery on the module side, but also reduces global network 10 load as well as processing load in the charging module 80. For the purpose of illustration, one credit unit may correspond to one byte of data transferred over the bus 180. When the network access module 120 is powered on and connected to the network, it announces its presence to the charging module 80 in the global radio network 10, using an identification message that includes sufficient data about the network access module 120, such as version, vendor, security features or other things, thus allowing the charging module 80 to determine the trustworthiness of the network access module 120. Based on the trustworthiness, the charging module 80 may be granting the network access module 120 a given amount of credit units, ranging from no credit units if the network access module 120 cannot be trusted to properly report the data transferred, to practically unlimited credit for a flat rate data plan. The exact size of the credit allowance is a tradeoff between charging practices, network optimization and risk adversity of the network operator. The credit allowance may have an expiration time after which the network access module 120 must either request a new credit allowance from the charging module 80 or refrain from using the local storage 160. For the running illustration, the charging module 80 may decide to grant the network access module 120 a credit allowance of 1000 credit units, to expire in one hour. When the mobile device 100 requests access to a network-based resource, e.g. a file, and that file can be found among available pre-cached files, the network access module 120 can enable access to it contingent upon the estimation that data transfer can be made within remaining credit units. In the current illustration, the mobile device 100 requests a file comprising 500 bytes of data. Since 1000 credit units where given, and each transferred byte consumes 1 credit unit, the file can be served from the local storage 160. 500 credit units are consumed from the network access module's 120 credit allowance. The consumed credit may be reported to the charging module 80 in various ways. It may be reported when the credit allowance is fully consumed, when the remaining credit units have expired, when more credit units are needed to fully serve a file, or when some other form of network activity occurs, such as e.g. a phone call, or some other form of service charging that might affect available money on a network operator account. In the case of a pre-paid account, calling may reduce the amount of available money, and, consequently, bandwidth. The network access module 120 must then report/request a new credit allowance in order to not overdraw the pre-paid account.

It is also possible to attempt to predictively request a credit allowance. In the running illustration, since only 500 credit units were consumed, 500 remain; there is no need to request a new credit allowance. The network access module 120 may then wait for the next request, or await expiration of the remaining credit allowance. At that point the network access module 120 reports the credit usage, while simultaneously requesting a new credit allowance. Based on past usage history and trustworthiness, the charging module 80 may vary credit allowance size and expiration period.

At the charging module 80 discretion, the remaining credit allowance may be nullified by the charging module 80 sending a credit nullification message to the network module.

Figure 4:
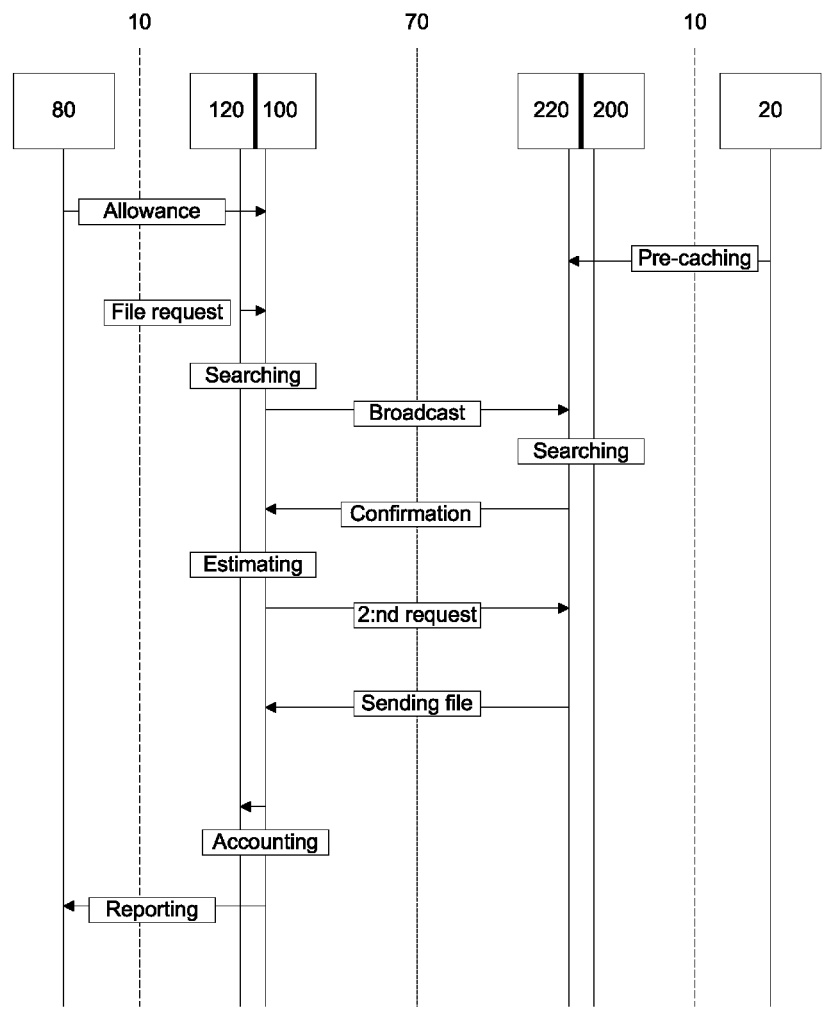
FIG. 4 is a sequence diagram illustrating an inter-related method according to one embodiment.

An inter-related method according to an embodiment of the present invention will now be described in relation to FIG. 4.

It is a method for file pre-caching and file retrieval in an autonomous network access module. The network access module comprises a local storage, and is operating in the system depicted in FIG. 1.

In a pre-caching step, the network access module 220 is receiving and storing in the local storage 260 a file comprising meta data, allotted for pre-caching by an operator of the global radio network 10. It is further receiving a broadcast file request from a peer network access module 120 in a local radio network 70. The broadcast file request comprises a globally unique identifier that the network access module 220 is using during searching for the requested file among available files in the local storage 260.

If the file is found, the network access module 220 is enabling the peer network access module 120 to access the file.

The enabling may be done such that the network access module 220 is sending an availability confirmation to the peer network access module 260, comprising meta data.

Further the enabling step comprises the step of awaiting a second request for the same file from the peer network access module 120; and upon reception of the second request, sending the file to the peer network access module 120 over the local radio network 70.

To further facilitate the peer-to-peer mode of operation, the network access module 220 can use any remaining available storage in the local storage 260 for any data traffic downloaded, i.e. also for files received through billed downloading. These additional files, which were not predicted by the prediction service 20, can then also be served to other network access modules 100 and 100' within personal operation space. These peer-to-peer transfers are also encrypted, thus reducing or preventing data leakage.

Since the network access module 220 is trusted by the network operator, any pre-cached file in the local storage 260, which turns out to comprise malware, can be efficiently removed and destroyed.

The number of pre-cached files available to each mobile device is multiplied if it can be retrieved from peers in a local network 70. This is an advantage to the end-user of the mobile device in question, as the average delivery time is correspondingly reduced when even less files must be requested from the global network 10. The method also enables access to global network 10 content, even though the mobile device may not actually be connected to the global network 10, or even in fact to the local network 70. The method also additionally reduces the traffic caused by mobile device requests. Further, this mitigates the moderate average traffic load increase caused by pre-caching.

As an example, in a situation where the pre-caching and prediction service 20 manages a group of files that are so frequently requested that they must be pre-cached and made available to all mobile devices in the global network 10, the related pre-caching traffic generated is file group size times number of mobile devices in the global network 10.

However, humans are social creatures of habit. Therefore, in all global radio networks, there will be collectives of mobile device's, the members of which by some satisfactory level of probability are interconnected via local radio networks. The pre-caching and prediction service 20 can analyze these collectives and decide to pre-cache the ten files only once collective as a whole and for most cases for each individual mobile device. The local radio link does not significantly increase delivery time of pre-cached content, the average delivery time is even further reduced, and peak traffic load further reduced when even less files must be requested from the global network 10. Further, this significantly reduces the average traffic load caused by pre-caching.

The aspects of the invention give many advantages. Firstly, if available among pre-cached files, the file can be delivered instantly. Secondly, the global network 10 load will not be affected by this particular file request of the mobile device 100. This means that even though pre-caching according to embodiments of this invention may cause a moderate average traffic load increase, it significantly lowers the peak traffic load induced by mobile device 100 requests, which in turn enables a higher network deployment.

Further, aspects of the invention allow the pre-caching of data, thus smoothing out the network traffic curve, while enabling billing the end-user for consumed data only. It does so in a way that allows the network operator to know that the data is properly accounted for, while not requiring additional network access for reporting charging information, and being completely transparent to all of the device's applications.

In addition, it enables a distributed pre-cache, distributed over network access modules within each others personal operating space and constituting a larger pre-cache storage, which has a better chance of containing requested information. This enables increased network operator data traffic revenue while reducing network load, since the same pre-cached file is available to and can be subsequently sent to several peer network access modules over a local radio network 70.

Because the pre-caching network access module is capable of operating independently of the main mobile device's processing unit, it is possible for the network access module to remain active while the mobile device's processing unit is shut off, in order to reduce power consumption while retaining the ability to provide the device with new data from the network, and retaining the ability to keep the pre-cached files available to other network access module's Because of the pre-cached data being available, the end-user experience is improved, since there is no global radio network round-trip time.

Solutions according to aspects of this invention are superior to an encryption/unlock solution as the latter requires both global radio network round-trip time and decryption overhead time after the file is requested, thus partially or fully negating any performance benefit gained by pre-caching.

The invention claimed is:

1. A method for file pre-caching and file retrieving in an autonomous network access module comprising a local storage, and providing network connectivity to a mobile device in a global radio network, the method comprising the steps of:
   receiving a file request to the global radio network from the mobile device;
   intercepting the file request;
   searching for the requested file among available pre-cached files
   and responding to finding the file by the further steps of,
   enabling the mobile device to access the file,
   measuring the amount of data transferred to the mobile device via a bus from the network access module, and accounting for the amount of data transferred, to a charging module in the global radio network;
   receiving a credit allowance from a charging module in the global radio network; and
   estimating the file size against remaining credit allowance, wherein the enabling step is further contingent upon the estimation that data transfer can be made within the remaining credit allowance.

2. The method according to claim 1, further comprising the step of receiving and storing in the local storage a file comprising meta data, allotted for pre-caching by an operator of the global radio network.

3. The method according to claim 1, wherein the searching step further comprises:
   searching for the requested file in the local storage.

4. The method according to claim 1, wherein the searching step further comprises:
   searching for the file in a local storage of a peer network access module in a local radio network.

5. The method according to claim 4, wherein the searching step further comprises:
   broadcasting a file request in the local radio network; and
   awaiting an availability confirmation comprising meta data from the peer network access module in the local radio network.

6. The method according to claim 5, wherein the step of enabling, upon receiving an availability confirmation, further comprises the steps of:
   sending a second file request to the peer network access module in the local radio network; and
   receiving the requested file from the peer network access module over the local radio network.

7. A method for file pre-caching and file retrieving in an autonomous network access module comprising a local storage and providing network connectivity to a mobile device in a global radio network, the method comprising the steps of:
   receiving and storing in the local storage a file comprising meta data, allotted for pre-caching by an operator of the global radio network;
   receiving a broadcast file request from a peer network access module in a local radio network; and searching for the requested file among available files in the local storage and responding to finding the file by enabling the peer network access module to access the file, wherein the enabling step further comprises the step of sending an availability confirmation to the peer network access module, comprising meta data.

8. The method according to claim 7, wherein the enabling step further comprises the steps of:
awaiting a second request for the same file from the peer network access module; and
responding to reception of the second request by sending the file to the peer network access module over the local radio network.

9. A network access module comprised within a mobile device, the network access module comprising a local storage, a radio transceiver and a processing unit, connected to the mobile device via a bus interface, adapted and configured to:
receive a file request to the global radio network from the mobile device;
intercept the file request;
search for the requested file among available pre-cached files;
and respond to finding the file by:
enabling the mobile device to access the file,
measuring the amount of data transferred to the mobile device via the bus from the network access module, and accounting for the amount of data transferred, to a charging module in the global radio network;
receive a credit allowance from a charging module in the global radio network;
estimate the file size against remaining credit allowance; and
enable the mobile device to access the file contingent upon estimating that data transfer can be made within the remaining credit allowance.

10. The network access module of claim 9 further adapted and configured to:
receive and store in the local storage a file comprising meta data, allotted for pre-caching by an operator of the global radio network.

11. The network access module of claim 9 further adapted and configured to:
search for the requested file in the local storage; and
respond to finding the file by enabling the mobile device to access the file.

12. The network access module of claim 11 further adapted and configured to:
broadcast a file request in a local radio network; and
await an availability confirmation comprising file size from the peer network access module in the local radio network.

13. The network access module of claim 12, wherein the enabling step, upon receiving an availability confirmation, further is adapted and configured to:
send a second file request to the peer network access module in the local radio network; and
receive the requested file from the peer network access module over the local radio network.

14. A network access module comprised within a mobile device, and comprising a local storage, a radio transceiver and a processing unit, connected to the mobile device via a bus interface, adapted and configured to:
receive and store in the local storage a file comprising file size, allotted for pre-caching by an operator of the global radio network;
receive a broadcast file request from a peer network access module in a local radio network;
search for the requested file among available files in the local storage;
respond to finding the file by enabling the peer network access module to access the file; and
send an availability confirmation to the peer network access module, comprising file meta data.

15. The network access module of claim 14 further adapted and configured to:
await a second request for the same file from the peer network access module; and
respond to receipt of the second request by sending the file including meta data to the peer network access module over the local radio network.

* * * * *